Dec. 12, 1950 W. H. ALLEN ET AL 2,533,340
EGG CARTON
Filed Jan. 24, 1947 7 Sheets-Sheet 1

Inventors:
William H. Allen
Maynard G. Hall
By:
Wallace and Cannon
Attorneys

Dec. 12, 1950
W. H. ALLEN ET AL
2,533,340
EGG CARTON
Filed Jan. 24, 1947
7 Sheets-Sheet 2
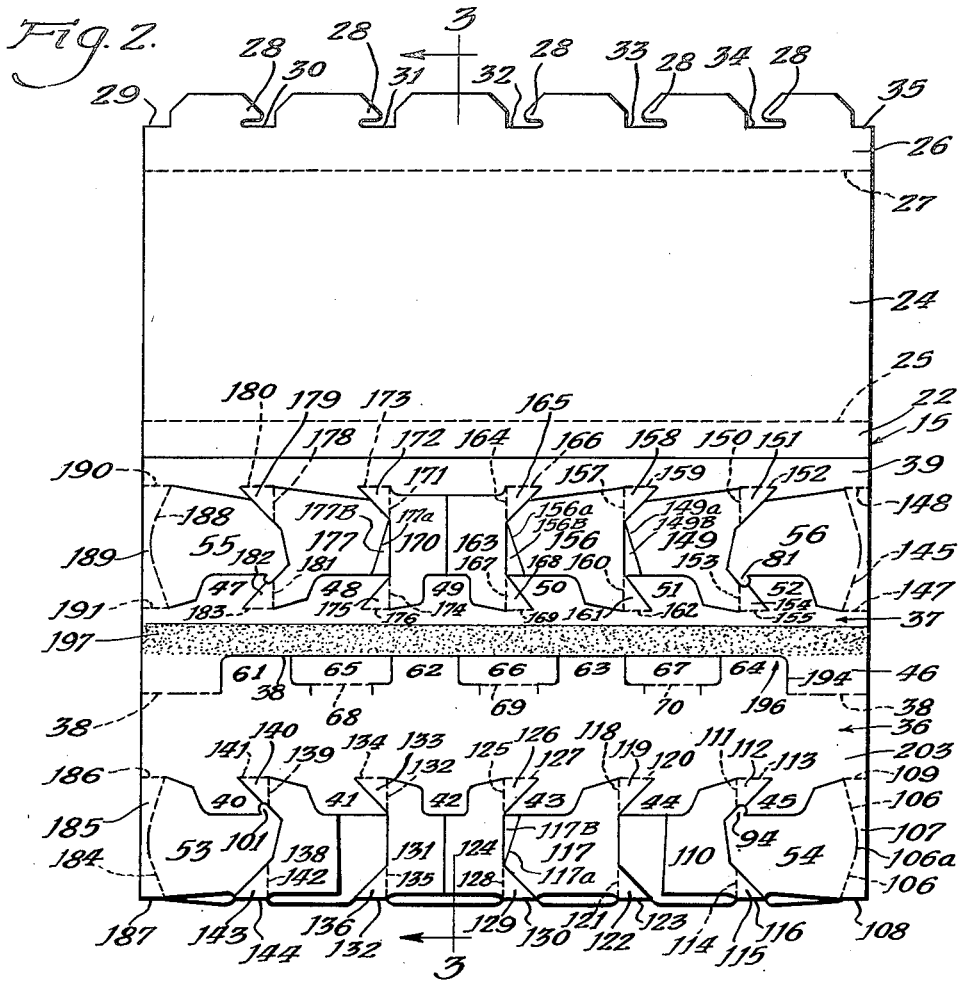
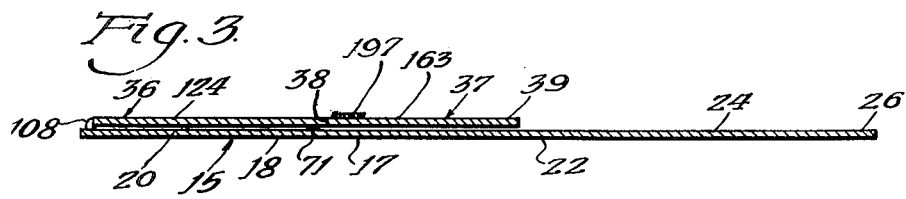
Inventors:
William H. Allen
Maynard G. Hall
By: Wallace and Cannon
Attorneys Dec. 12, 1950     W. H. ALLEN ET AL     2,533,340
EGG CARTON
Filed Jan. 24, 1947     7 Sheets-Sheet 3
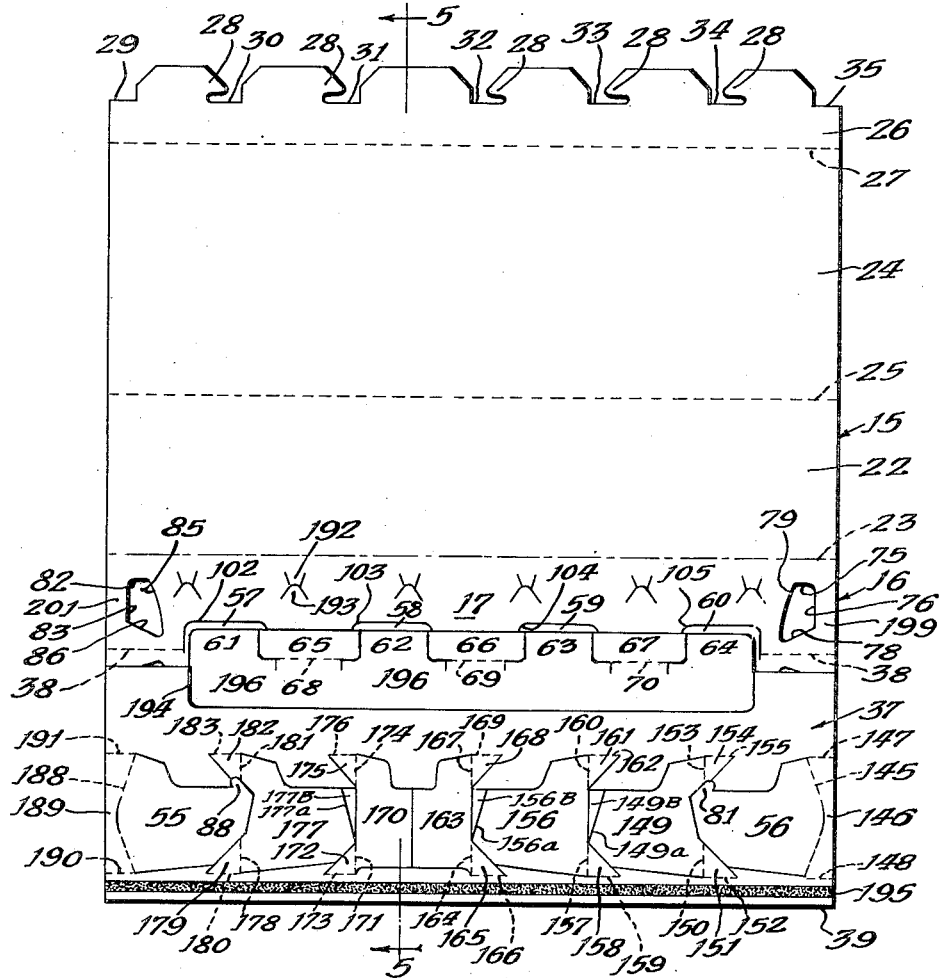
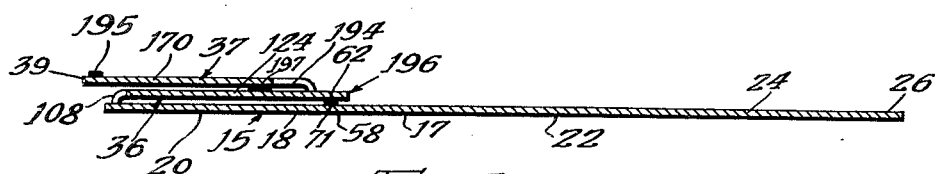

Dec. 12, 1950    W. H. ALLEN ET AL    2,533,340
EGG CARTON
Filed Jan. 24, 1947    7 Sheets-Sheet 4
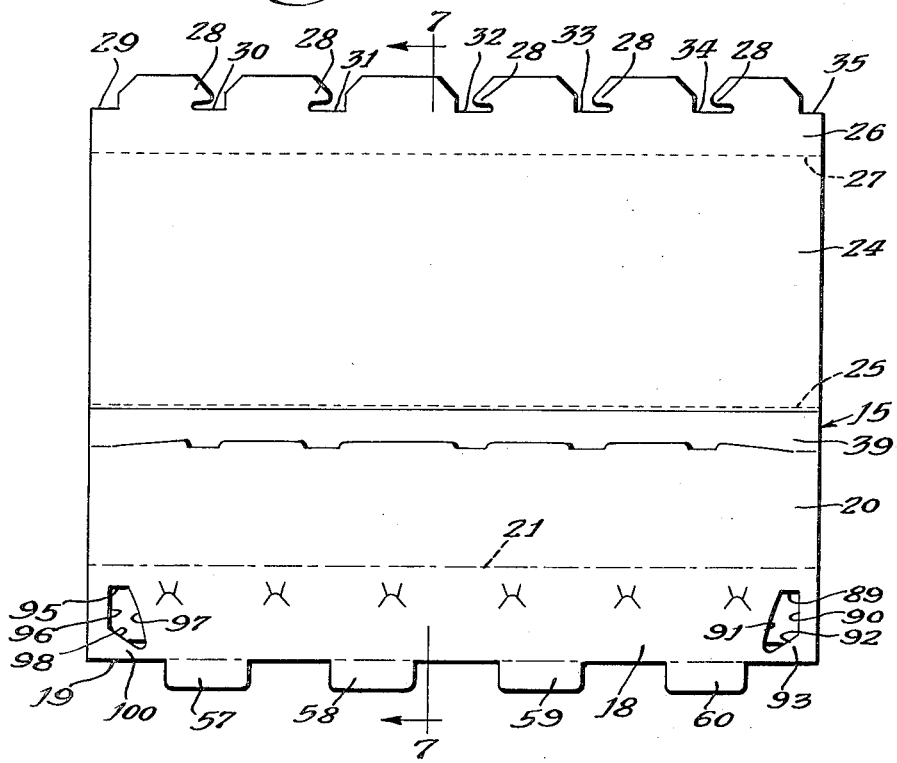
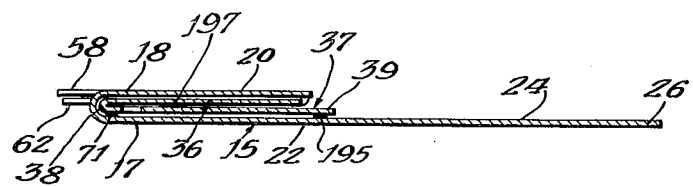
Inventors:
William H. Allen
Maynard G. Hall
By Wallace and Cannon
Attorney Dec. 12, 1950     W. H. ALLEN ET AL     2,533,340
EGG CARTON
Filed Jan. 24, 1947     7 Sheets—Sheet 5
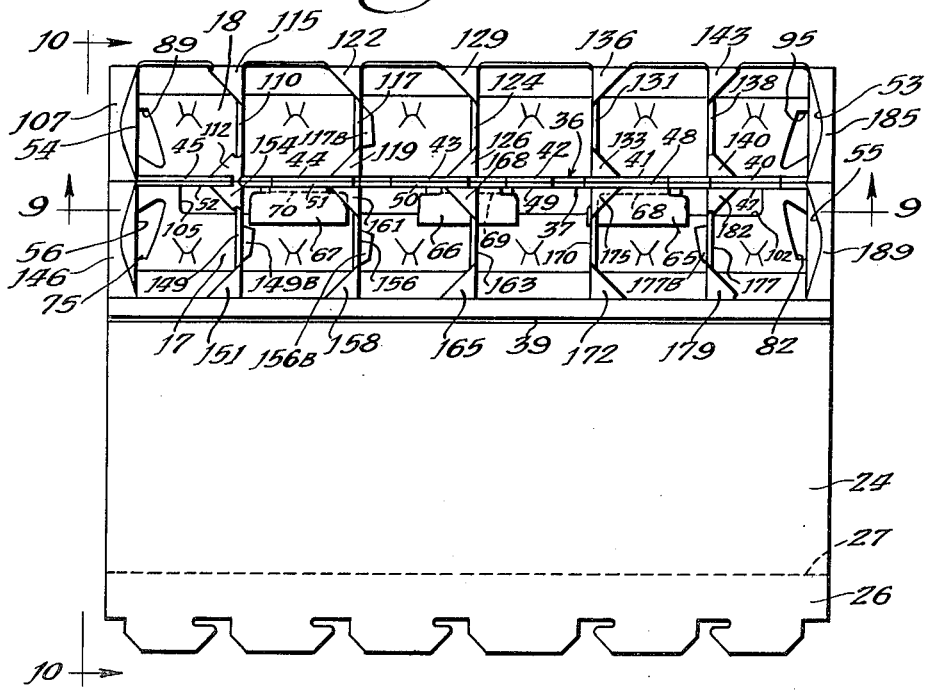
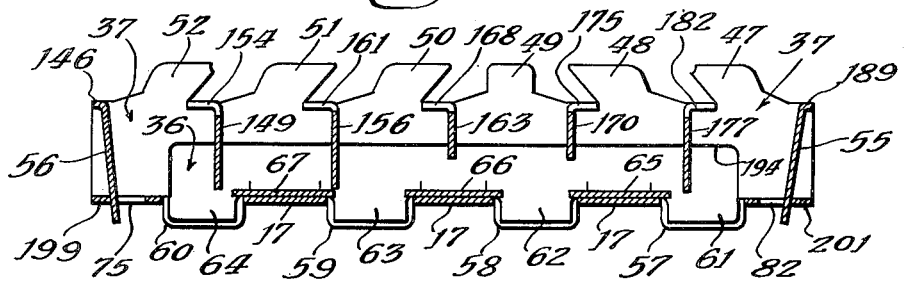
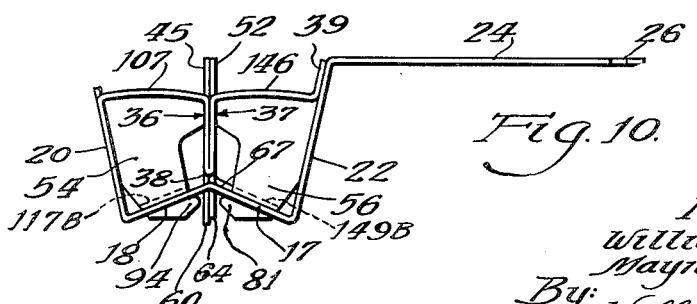
Inventors:
William H. Allen
Maynard G. Hall
By: Wallace and Cannon
Attorneys

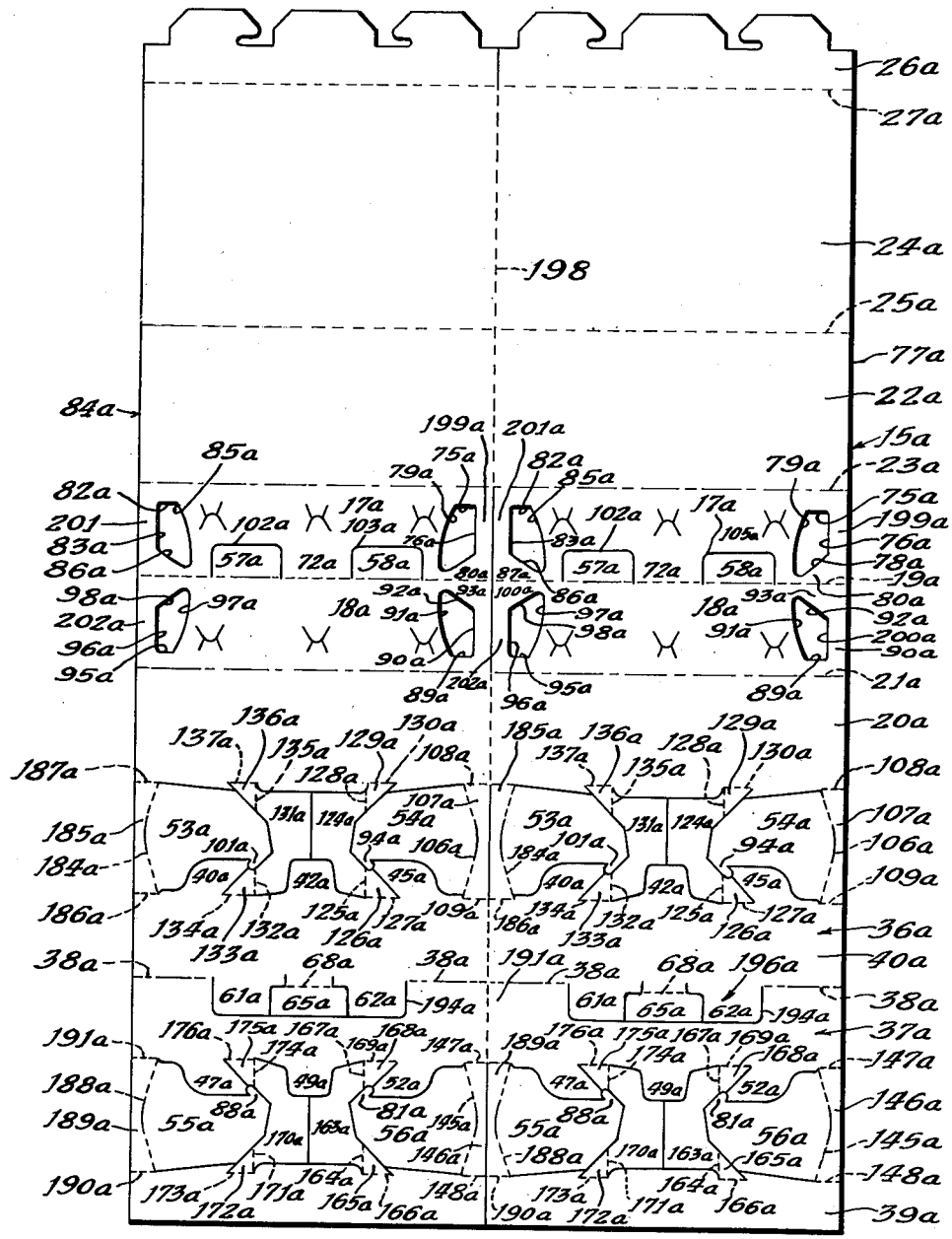

Dec. 12, 1950 W. H. ALLEN ET AL 2,533,340
EGG CARTON
Filed Jan. 24, 1947 7 Sheets-Sheet 7
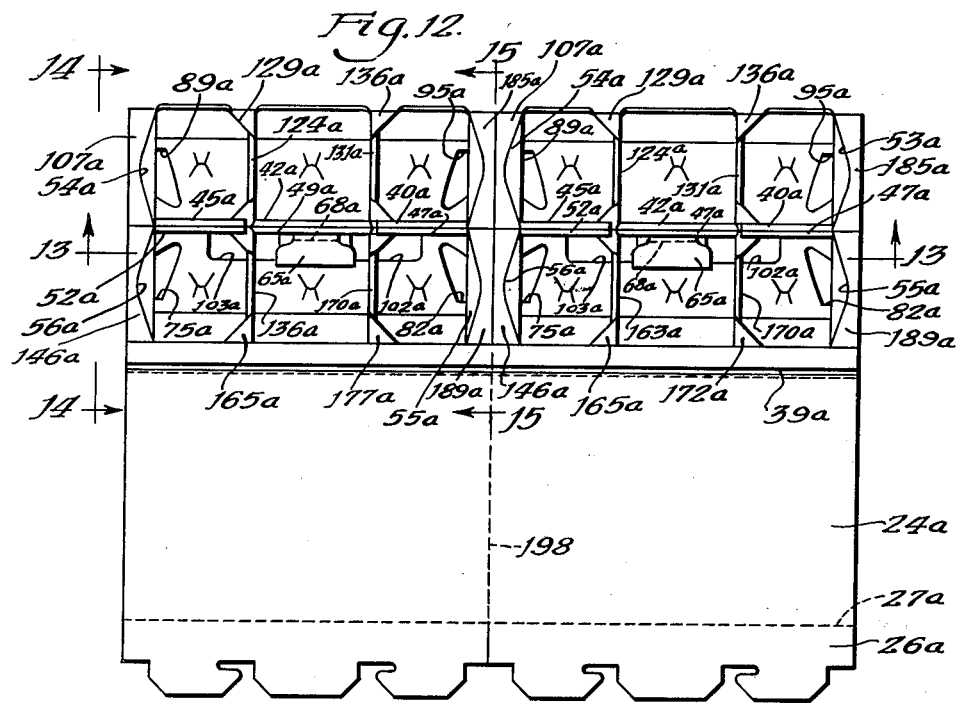
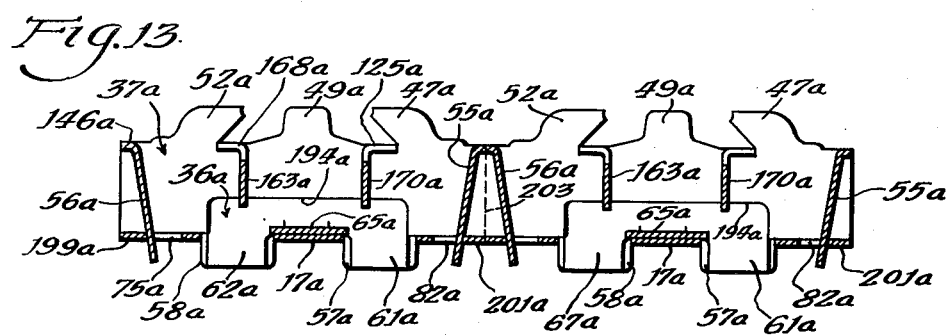
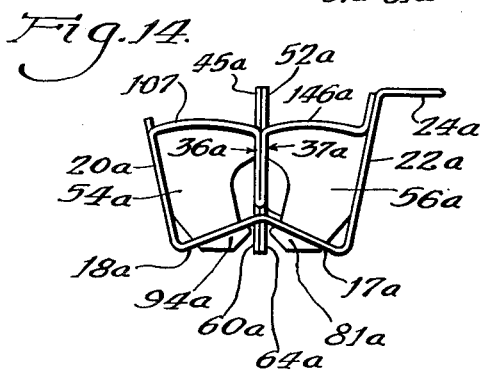 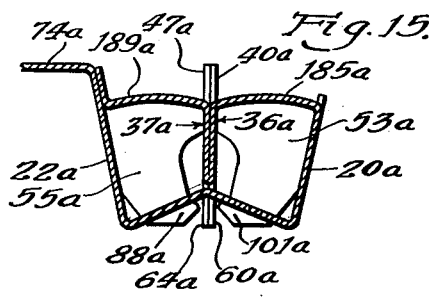
Inventors:
William H. Allen
Maynard G. Hall
By: Wallace and Cannon
Attorneys Patented Dec. 12, 1950

2,533,340

UNITED STATES PATENT OFFICE 2,533,340

EGG CARTON

William H. Allen, Teaneck, and Maynard G. Hall, Rutherford, N. J., assignors to Empire Box Corporation, Garfield, N. J., a corporation of Delaware Application January 24, 1947, Serial No. 724,168

12 Claims. (Cl. 229—28)

This invention relates to egg cartons. More specifically, this invention relates to egg cartons which are made from a single blank which is cut, scored or creased, and glued to form a unitary egg carton.

The present invention relates to an egg carton which represents an improvement upon the egg carton which is disclosed and claimed in the copending application of the applicant, William H. Allen, on "Egg Cartons" filed March 21, 1945, Serial No. 583,988. Like the egg carton which forms the subject matter of the aforesaid application the egg carton of the present application is formed from a single blank of paperboard which is cut, scored, glued and folded to form an egg carton which includes a front wall, a rear wall, a central longitudinal partition, a pair of bottom wall sections which are inclined upwardly from their outer ends to their inner ends where they are integrally joined to the central longitudinal partition. The bottom wall sections are held in inclined and cushion-forming position by means of primary bottom wall-supporting feet or members which extend below the central longitudinal partition in the same vertical plane therewith. Each of these primary bottom wall supporting feet or members is formed from a pair of adhesively joined elements or tongues one of which is partially cut from one of the bottom wall sections of the carton and the other of which adhesively joined elements or tongues is formed as an integral part of one of the central longitudinal partition-forming sections of the carton. By means of this construction, which is also embodied in the egg carton which forms the subject matter of the above-entitled application, the bottom wall sections of the egg carton are held in raised and inclined cushion-forming position without being supported by or from the transverse partitions or egg cell dividers as was the customary practice heretofore prior to the carton which forms the subject matter of the aforesaid application.

We have now found, however, that occasionally one of the adhesively connected elements of the primary bottom wall supporting feet or members which are embodied in the egg carton which forms the subject matter of the aforesaid application may become detached or unglued from its companion element when the egg carton is filled and in use and this may occasionally result in a tendency of one or more of such primary bottom wall-supporting elements to fail to perform its or their intended functions of supporting the inner end portions of the bottom wall sections in raised and inclined cushion-forming position.

Accordingly, an object of the present invention is to improve upon the egg carton which forms the subject matter of the aforesaid application by providing in the said egg carton auxiliary supporting members which are integrally and hingedly joined to one of the central longitudinal partition-forming sections and which are adhesively joined to one of the bottom wall sections of the carton for the purpose of supporting the inner end portions of the said wall sections of the carton in raised and inclined cushion-forming position particularly in the event that the adhesively joined elements of one or more of the primary supporting feet or members should become unglued or detached from each other and thus fail partly or entirely to perform its intended function of supporting the inner end portions of the bottom wall sections in raised and inclined cushion-forming position.

An additional object of the present invention is to provide a one-piece egg carton blank embodying the new auxiliary bottom wall-supporting elements.

A further object of the invention is to design the egg carton blank from which the new egg carton is made in such a manner that all of the parts thereof are formed within and lie entirely within the substantially parallel side marginal edges of the carton blank, thereby effecting an economy in the amount of paperboard stock required to form the new egg carton blank as compared to comparable egg carton blanks in which certain parts such as the end flaps are formed in part from paperboard stock which project outwardly beyond the side marginal edges of the blank.

Another object of the invention is to provide in one form of the invention an egg carton which embodies all of the novel features of the new egg carton which has been referred to hereinbefore and, in addition thereto, is transversely divisible so that it may be readily manually divided into two twin egg carton sections each holding six eggs in two rows of three.

Another object of the invention is to provide a novel method of cutting, scoring, gluing and assembling an egg carton blank to form the new egg carton having the novel features and advantages hereinbefore referred to.

A further object of the invention is to provide in the new egg carton a novel construction for preventing rupturing of the end portions or end webs of the bottom walls of the carton and for preventing the downwardly foldable end flaps of the new egg carton from being pushed outwardly from the slots or openings in the bottom walls of the carton in which the lower end portions of said end flaps are extended downwardly through the said slots or openings and the carton is filled with eggs.

Other and further objects of the present invention will be apparent from the following description and claims and are illustrated in the accompanying drawings which, by way of illustration, show preferred embodiments of the invention and the principles thereof, and what we now consider to be the best modes in which we have contemplated applying those principles. Other embodiments of the invention embodying the same or equivalent principles may be used and structural changes may be made as desired by those skilled in the art without departing from the present invention and the purview of the appended claims.

Fig. 2 is a top plan view of the parts of the blank shown in Fig. 1 after the completion of the first gluing and folding operation involved in forming the new one-piece collapsible egg carton from the blank shown in Fig. 1;

Fig. 3 is a transverse vertical sectional view on line 3—3 in Fig. 2 showing the relative positions of the parts after the first gluing and folding operation referred to in the description of Fig. 2;

Fig. 4 is a top plan view of the parts of the blank shown in Fig. 1 after the completion of the second gluing and folding operation involved in forming the new one-piece collapsible carton from the blank shown in Fig. 1;

Fig. 5 is a vertical sectional view on line 5—5 in Fig. 4 showing the relative positions of the parts after the completion of the second gluing and folding operation referred to in the description of Fig. 4;

Fig. 6 is a top plan view showing in flat, collapsed condition a completed and fully assembled carton formed from the blank shown in Fig. 1 ready for shipment and prior to being set up or erected for the reception of eggs;

Fig. 7 is a vertical sectional view on line 7—7 in Fig. 6 showing the relative positions of the parts as they appear in the completed collapsed carton shown in Fig. 6;

Fig. 8 is a top plan view showing a completely assembled egg carton erected from the collapsed form shown in Figs. 6 and 7, and made from the blank illustrated in Fig. 1, in erected condition and showing the parts thereof as they appear when the egg cells of the carton are filled;

Fig. 9 is a central longitudinal vertical sectional view on line 9—9 in Fig. 8;

Fig. 10 is an end elevational view on line 10—10 in Fig. 8;

Fig. 11 is a plan view of an egg carton blank embodying a modified form of the invention and from which a transversely divisible carton may be made;

Fig. 12 is a top plan view of a transversely divisible and assembled and erected egg carton formed from the egg carton blank shown in Fig. 11;

Fig. 13 is a central longitudinal vertical sectional view on line 13—13 in Fig. 12;

Fig. 14 is an end elevational view on line 14—14 in Fig. 12, a part of the cover being broken away; and Fig. 15 is a transverse vertical sectional view on line 15—15 in Fig. 12, a part of the cover being broken away.

Figure 1:
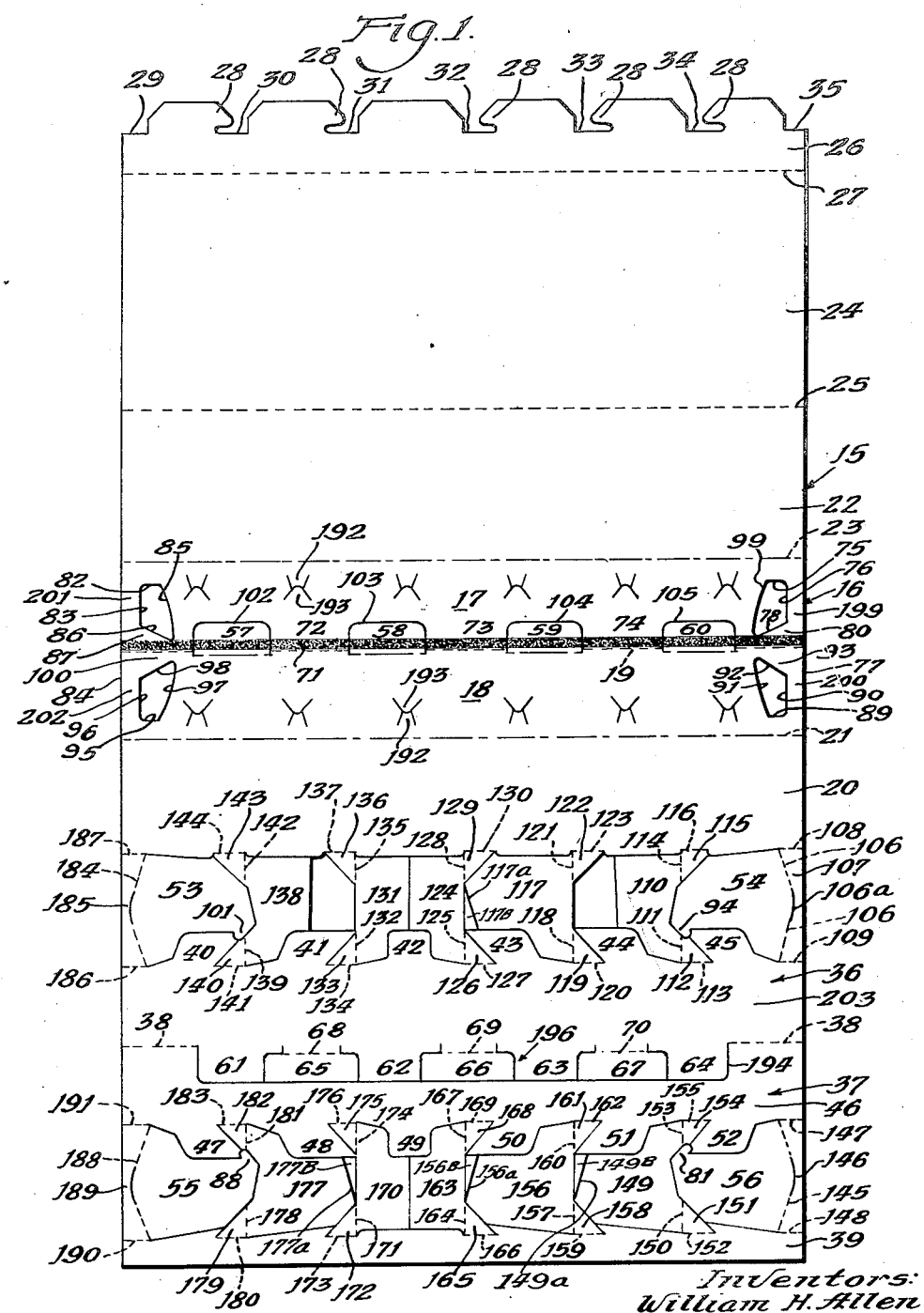
Fig. 1 is a plan view of a blank from which a typical embodiment of the new egg carton may be made.

One form of the present invention is illustrated in Figs. 1 to 10, inclusive, of the drawings, and comprises a one-piece carton blank 15, shown in Fig. 1, and which may be cut from any suitable paperboard or cardboard or other suitable stock which may be used in making egg cartons. As shown in Fig. 1, the blank is generally indicated at 15 and comprises a bottom wall 16 which includes two bottom wall sections 17 and 18 which are integrally joined by a fold line 19 which extends longitudinally of the bottom wall 16 and transversely relative to the long axis of the blank 15. The blank 15 also includes a front wall section 20, which is integrally joined to the bottom wall section 18 by a fold line 21, and a rear wall section 22 which is integrally joined to the bottom wall section 17 by a fold line 23. The blank 15 also includes a top wall or cover section 24 which is integrally joined to the rear wall section 22 by a fold line 25 and a cover latching strip section or flap 26 which is integrally joined to the top wall section or cover 24 by a fold line 27. The cover latching section or flap 26 is provided with attaching hooks 28 and cutout portions or notches 29 to 35, inclusive, which will be referred to again hereinafter.

The blank from which the new egg carton shown in Figs. 1 to 10, inclusive, is formed also includes a pair of longitudinal or center partition-forming and transverse partition-forming and end flap-forming sections 36 and 37 which are arranged contiguous to each other in the blank (Fig. 1). The sections 36 and 37 are integrally joined by a pair of aligned but spaced fold lines 38 which are arranged at opposite ends of the carton blank (Fig. 1). The two fold lines 38 are arranged at opposite ends of a U-shaped portion or tongue 196 which is formed as an integral extension of the section 36 and by forming a correspondingly partially cut-out portion 194 in the section 37. As shown in Fig. 1, an attaching strip or so-called glue strip 39 is integrally connected to the center or longitudinal partition-forming transverse partition-forming section 37, at one end of the blank.

The longitudinal or center partition-forming and transverse partition-forming and end flap-forming section 36 includes a main body portion 203 and formed integral with this main body portion 203, at one side thereof, is a series of cover-supporting elements 40, 41, 42, 43, 44 and 45 (Fig. 1). The longitudinal or center partition-forming and transverse partition-forming and end flap-forming section 37 includes a main body portion 46 and formed integrally with this main body portion 46 is a series of cover-supporting elements 47, 48, 49, 50, 51 and 52, respectively (Fig. 1). Likewise, the section 36 has a pair of end walls or end flaps 53 and 54 formed therein at the ends thereof and the section 37 has a pair of similarly shaped end walls or end flaps 55 and 56 formed therein at the ends thereof.

As shown in Fig. 1, the bottom wall forming section 17 of the blank 15 has a series of spaced tongues or bottom wall-supporting elements 57, 58, 59 and 60 formed therein. These tongues or bottom wall-supporting elements 57, 58, 59 and 60 are partially cut from the bottom wall section 17 to provide openings or slots 102, 103, 104 and 105, respectively, in the bottom wall section 17. The tongues or bottom wall-supporting elements 57, 58, 59 and 60 are hingedly connected at one side to the bottom wall section 18 along the fold line 19. The tongue portion 196 of the body 203 of the center and longitudinal partition-forming section 36 has a series of spaced tongues or bottom wall-supporting elements 61, 62, 63 and 64 formed therein and, as will be explained hereinafter, in the glued, assembled and erected condition of the carton these tongues or bottom wall-supporting elements 61, 62, 63 and 64 are glued to and cooperate with the tongues or bottom wall-supporting elements 57, 58, 59 and 60, respectively, to provide primary supporting elements or supporting feet which extend downwardly from the central longitudinal partition in the same vertical plane therewith and cooperate with the central longitudinal partition to retain the inner end portions of the bottom wall sections 17 and 18 in raised and inclined cushion-forming position.

The tongue portion 196 of the body 203 of the central longitudinal partition-forming section 36 also has a series of spaced auxiliary bottom wall-supporting elements 65, 66 and 67 formed therein. These spaced auxiliary supporting elements 65, 66 and 67 are hingedly connected to the body 203 of the said central longitudinal partition-forming section 36 by means of fold lines 68, 69 and 70, respectively, which extend parallel to the fold lines 38 between the latter (Fig. 1). As will be explained hereinafter, in the glued and assembled and erected condition of the new egg carton these auxiliary supporting elements 65, 66 and 67 are adhesively secured along and by means of a glue line 71 to complementary tongue portions or areas 72, 73 and 74 which are formed as integral parts of the bottom wall section 17. These tongue portions or areas 72, 73 and 74 of the bottom wall section 17 are disposed between the adjacent pairs of tongues 57—58, 58—59 and 59—60, respectively, and the said tongues 72, 73 and 74 cooperate with the tongues 65, 66 and 67, respectively, to which they are glued, to provide auxiliary supporting elements for maintaining the central longitudinal partition and the bottom wall sections 17 and 18 in assembled relation and in raised and inclined cushion-forming position if at any time in the use of the new egg carton the parts of some or all of the main supporting elements formed by the adhesively joined pairs of tongues 57—61, 58—62, 59—63 and 60—64 should become separated or detached from each other by failure of the adhesive or glue connections therebetween.

The bottom wall section 17 has a slot or opening 75 formed in one end portion thereof. As shown in Fig. 1, this slot or opening 75 has an outer side edge 76 which is disposed inwardly of and extends parallel to the side marginal edge 77 of the carton blank 15. The slot or opening 75 also has a somewhat curved or arcuate inner side edge 79 and an end edge 78 which extends angularly between and interconnects the side edges 76 and 79. This arrangement provides a generally triangular-shaped latching portion or area 80 in the bottom wall section 17, between the end edge 78 of the opening or slot 75 and the fold line 19. This latching portion or area 80 is adapted to be latchingly engaged by a hook-shaped lower end portion 81 of the end wall or end flap 56 when the new carton is in glued, assembled, erected and filled condition, for reasons which will be described hereinafter.

The bottom wall-forming section 17 has a second slot or opening 82 formed in its other end portion (Fig. 1). This slot or opening 82 has an outer side edge 83 which is disposed inwardly of and extends parallel to the side edge 84 of the carton blank 15. Likewise, the slot or opening 82 has a somewhat curved or arcuate-shaped inner side edge 85 and an angularly extending edge 86 which interconnects the inner side edge 85 with the outer side edge 83 of the slot or opening 82. This arrangement provides a generally triangular-shaped latching portion or area 87 between the end edge 86 of the slot or opening 82 and the fold line 19, and in the glued, assembled, erected and filled condition of the carton this generally triangular-shaped latching portion 87 is latchingly engaged by a hook-shaped lower end portion 88 of the end wall or end flap 55, for a reason which will be set forth hereinafter.

The bottom wall-forming section 18 of the carton blank 15 has a slot or opening 89 formed in one end portion thereof and this slot or opening 89 has an outer side edge 90 which is disposed inwardly of and extends parallel to the side marginal edge 77 of the carton blank 15 (Fig. 1). The slot or opening 89 has a somewhat curved or arcuate-shaped inner side edge 91 and an angularly extending edge 92 which extends between and interconnects the inner and outer side edges 91 and 90, respectively, of the slot or opening 89. This arrangement provides a generally triangular-shaped area or latching portion 93 in the bottom wall-forming section 18 between the angularly extending end edge 92 of the slot or opening 89 and the fold line 19. This latching portion 93 is adapted to be latchingly engaged by the hook-shaped lower end portion 94 of the end flap or end wall 54 when the new carton is glued, assembled, erected and filled, for a reason which will be described hereinafter.

The bottom wall section 18 also has a second opening or slot 95 formed therein, in the other end portion thereof and this slot or opening 95 has an outer side edge 96 which is disposed inwardly of and extends parallel to the marginal side edge 84 of the carton blank 15. The slot or opening 95 also has a somewhat curved or arcuate inner side edge 97 and an angularly extending end edge 98 which interconnects the inner and outer side edges 96 and 97, respectively, of the slot or opening 95. This arrangement provides a generally triangular-shaped latching area or portion 100 in the bottom wall-forming section 18 between the slot or opening 95 and the fold line 19. When the new carton blank 15 is glued, assembled, erected and filled a hook-shaped portion 101 of the end wall or end flap 53 latchingly engages with the generally triangular-shaped latching portion 100 of the bottom wall-forming section 18, for a reason which will be explained hereinafter.

The construction of the bottom wall sections 17 and 18, as thus defined, is such that relatively narrow web portions 199, 201, 200 and 202, are provided in the said bottom wall sections 17 and 18 between the outer side edges 76, 83, 90 and 96 of the slots or openings 75, 82, 89 and 95, respectively, and the adjacent marginal side edges 77 and 84 of the carton blank 15, as shown in Fig. 1.

The longitudinal or center partition-forming and transverse partition-forming and end flap-forming section 36 also has a series of transverse partitions or egg cell dividers 110, 117, 124, 131 and 138 formed therein and the longitudinal or center partition-forming and transverse partition-forming and end flap-forming section 37 has a corresponding and complementary row of transverse partitions or egg cell dividers 149, 156, 163, 170 and 177 formed therein (Fig. 1).

By reference to Fig. 1 it will be noted that the end wall or end flap 54 is hingedly connected at its outer end by fold lines 106 to a supporting hinge web 107. The two fold lines 106 are separated by an intermediate curved knife cut 106W and the other end flaps 53, 55 and 56 are similarly formed. The supporting hinge web 107 is connected at one end by a fold line 108 to the front wall section 20 and the hinge web 107 is connected at its other end to the section 36 by a fold line 109.

The end flap 53 is hingedly connected at its outer end by fold lines 184 to a hinged supporting web 185 which is attached at one end to the section 36, by a fold line 186, and which is attached at its other end by a fold line 187 to the front wall section 20. Similarly, the end flap 55 is hingedly connected at its outer end by fold lines 188 to a hinged supporting web 189 which is attached at one end by a fold line 190 to the guide strip 39, the other end portion of the hinged supporting web 189 being hingedly attached by a fold line 191 to the section 37. Likewise, the end flap 56 is hingedly connected at its outer end by fold lines 145 to a hinged supporting web 146 which is hingedly attached at one end, by a fold line 147, to the section 37, the other end portion of the hinged supporting web 146 being attached by a fold line 148 to the glue strip 39.

As shown in Fig. 1, the transverse partitions or egg cell dividers 110, 117, 124, 131 and 138 are integrally joined at one side by fold lines 114, 121, 128, 135 and 142 to triangular-shaped attaching and hinge webs 115, 122, 129, 136 and 143, respectively. These attaching and hinge webs 115, 122, 129, 136 and 143 are integrally connected by fold lines 116, 123, 130, 137 and 144, respectively, to the front wall section 20. At their other side the transverse partitions or egg cell dividers 110, 117, 124, 131 and 138 are connected by fold lines 111, 118, 125, 132 and 139 to triangular-shaped attaching and hinge webs 112, 119, 126, 133 and 140, respectively, and these attaching and hinge webs 112, 119, 126, 133 and 140 are formed integrally with the body 203 of the longitudinal partition-forming and transverse partition-forming and end flap-forming section 36 (Fig. 1).

The transverse partitions or egg cell dividers 149, 156, 163, 170 and 177 are hingedly connected at one side by fold lines 153, 160, 167, 174 and 181 to triangular-shaped attaching and hinge webs 154, 161, 168, 175 and 182, respectively, and these triangular-shaped attaching and hinge webs 154, 161, 168, 175 and 182 are formed integrally with the body 46 of the longitudinal partition-forming and transverse partition-forming and end flap-forming section 37. At their other side the transverse partitions or egg cell dividers 149, 156, 163, 170 and 177 are hingedly connected by fold lines 150, 157, 164, 171 and 178 to triangular-shaped attaching and hinge webs 151, 158, 165, 172 and 179, respectively, and these triangular-shaped attaching and hinge webs 151, 158, 165, 172 and 179 are formed integrally with the glue strip 39 (Fig. 1).

As shown in Fig. 1, the transverse partitions or egg cell dividers 117, 149, 156 and 177 have angularly extending fold lines 117a, 149a, 156a and 177a, respectively, formed therein, and these fold lines form substantially triangular-shaped hinged foot portions or feet 117b, 149b, 156b and 177b in the outer end portions of the said transverse partitions or egg cell dividers 117, 149, 156 and 177, respectively, for a purpose which will be referred to hereinafter.

In gluing, forming and assembling the carton blank shown in Fig. 1 to form the carton which is to be made therefrom, and as the carton is passed through the gluing and forming machine, a glue strip 71 is placed upon one side edge portion of the bottom wall section 17 adjacent the fold line 19 and, as shown in Fig. 1, this glue strip 71 extends across the upper surfaces of the parts or tongues 57, 58, 59 and 60 and also across the upper surfaces of the tongue portions or areas 72, 73 and 74 which are formed in the bottom wall section 17. The center or longitudinal partition-forming and transverse partition-forming and end flap-forming sections 36 and 37 and the attached glue strip 39 are then folded as a unit upon the fold line 108—116—123—130—137—144, as a hinge, into the position in which the parts are shown in Figs. 2 and 3 of the drawings. During this first gluing and folding operation the parts or elements 61, 62, 63 and 64 which are embodied in the tongue portion 196 of the body 203 of the center or longitudinal partition-forming and transverse-partition forming and end flap-forming section 36 are positioned above and are pressed into contact with and are thus glued to the adhesively coated upper surfaces of the tongues 57, 58, 59 and 60, respectively. At the same time, the auxiliary bottom wall-supporting elements 65, 66 and 67, which are also formed in the tongue portion 196 of the body 203 of the section 36, are disposed above and are glued to the adhesively coated upper surfaces of the parts or areas 72, 73 and 74, respectively, of the bottom wall section 17. The parts of the thus partially assembled carton are then disposed in the position in which they are shown in Figs. 2 and 3 of the drawings.

When the parts of the new carton blank 15 are disposed in the position in which they are shown in Figs. 2 and 3 of the drawings a glue stripe 197 is placed upon the then upper surface of the body portion 46 of the section 37 from end to end thereof and in the area thereof which is disposed between the cut-out portion 194 and the inner ends of the cover-supporting elements 47 to 52, inclusive, as shown in Fig. 2.

The center or longitudinal partition-forming and transverse partition-forming and end flap-forming section 37 and attached glue strip 39 are then folded, as a unit, upon the fold lines 38 as a hinge onto and into a position above but parallel to the section 36. This operation brings the adhesively coated surface of the body portion 46 of the section 37 into contact with the body portion 203 of the section 36. It will be noted, however, that during this operation the tongue portion 196 of the body 203 of the section 36 remains stationary and does not pivot with the section 37 by reason of the adhesive attachment of the parts 61—65—62—66—63—67 and 64 with the parts 57—72—58—73—59—74 and 60, respectively. The parts then appear in the position in which they are shown in Figs. 4 and 5 of the drawings.

When the parts the thus disposed in the position in which they are shown in Figs. 4 and 5 of the drawings, the then upper surface of the glue strip 39 is provided with an adhesive coating or glue strip 195 (Figs. 4 and 5). The sections 37 and 36, the front wall section 20, and the bottom wall section 18 are then pivoted as a unit, upon the fold lines 38 as hinges (clockwise, Fig. 5), into the position in which the parts are shown in Figs. 6 and 7 of the drawings.

This final folding operation brings the adhesively coated surface 195 of the glue strip 39 above and into adhesive engagement with the then upper surface of the bottom wall-forming section 22, thereby completing the gluing, folding and assembly of the carton blank 15 to form the new egg carton which then appears in the flat, collapsed position in which it is shown in Figs. 6 and 7 of the drawings ready for shipment and use.

In order to erect the new egg carton from the completely assembled but flat, collapsed position in which it is shown in Figs. 6 and 7, it is merely necessary to pull the front wall section 20 and the bottom wall section 18 outwardly from collapsed or flat condition, as in Figs. 6 and 7, and away from the rear wall section 22. This movement of the front wall section 20 and of the bottom wall section 18 attached thereto pulls the two end flaps 54 and 53 and the row of transverse partitions or egg cell dividers 110, 117, 124, 131 and 138 which are connected to the said front wall section 20, into horizontal position. This movement of the end flaps 54 and 53 and of the transverse partitions or egg cell dividers 110, 117, 124, 131 and 138 into horizontal position moves the body portions 203 and 46 of the center or longitudinal partition-forming sections 36—37 into upright or vertically extending position. As the body portions 203 and 46 of the center or longitudinal partition-forming sections 36 and 37 are thus moved into upright or vertically extending position they move the other two end flaps 55 and 56 and the other row of transverse partitions or egg cell dividers 177, 170, 163, 156 and 149 disposed therebetween into horizontal position. As the carton shown in Figs. 1 to 10, inclusive, is thus erected from its flat or collapsed condition, as seen in Figs. 6 and 7, into erected condition, as seen in Figs. 8, 9 and 10, the primary bottom wall-supporting feet or members which are formed by the adhesively joined or laminated parts 61—57, 62—58, 63—59, and 64—60 are moved into upright vertical supporting position under the bottom wall of the carton and into the same vertical plane with the center or longitudinal partition. During this operation the auxiliary bottom wall-supporting members 65, 66 and 67 pivot upon their fold lines 68, 69 and 70, respectively, as hinges, and with the bottom wall section 17 to which they are adhesively attached, into a position above and parallel to the said bottom wall section 17. The erection of the carton may then be completed by swinging the end walls or end flaps 53, 54, 55 and 56 downwardly upon their fold lines 184, 106, 188, and 145, respectively, as hinges, and meanwhile inserting the hook-shaped lower end portions 101, 94, 88 and 81 of these end walls or end flaps 53, 54, 55 and 56 into the slots or openings 95, 89, 82 and 75, respectively, which are formed in the bottom wall sections 17 and 18 of the carton. Eggs may then be inserted into the egg cells in the thus erected carton and as the eggs are inserted therein the egg cell dividers or transverse partitions 149, 156, 163, 170, 177, 110, 117, 124, 131 and 138 are swung or forced downwardly thereby on their fold lines 150—153, 157—160, 164—167, 171—174, 178—181, 111—114, 118—121, 125—128, 132—135, and 139—142, respectively, as hinges, into the vertically extending position in which they are shown in Figs. 8 and 9 of the drawings.

It will be noted that as and when the transverse partitions or egg cell dividers 117, 149, 156 and 177 are moved into vertically extending position the hinged feet 117b, 149b, 156b and 177b wipingly engage the upper surface of the bottom wall sections 18 and 17 of the carton and in so doing pivot upon their fold lines 117a, 149a, 156a, 177a, respectively, as hinges, relative to the body portions of the transverse partitions or egg cell dividers 117, 149, 156 and 177, respectively. These hinged feet 117b, 149b, 156b and 177b thus come to rest in contact with and in planes substantially parallel to the upper surfaces of the bottom wall sections 18 and 17, as shown in Figs. 8 and 10. These feet 117b, 149b, 156b and 177b thus assist in retaining the transverse partitions or egg cell dividers in effective upright position.

It will be noted that when the new egg carton has been thus erected and filled the hook-shaped lower end portions 81, 94, 101 and 88 of the end walls or end flaps 56, 54, 53 and 55, respectively, project downwardly through the slots or openings 75, 89, 82 and 95, respectively, in the bottom wall sections 17 and 18 of the carton and below the said bottom wall sections 17 and 18, as shown in Fig. 10 of the drawings. This arrangement is such that when eggs are placed in the end cells of the erected new egg carton the eggs tend to urge the lower end portions of the end flaps 56, 54, 53 and 55 outwardly toward and into engagement with the side edges 76, 90, 83 and 96 of the slots or openings 75, 89, 82 and 95, respectively, in the bottom wall sections 17 and 18 of the carton. During this movement of the said end flaps 56, 54, 53 and 55 the hook-shaped lower end portions 81, 94, 101 and 88 thereof, respectively, latchingly engage under the generally triangular-shaped latching webs or portions 80, 93, 87 and 100, respectively, which are formed in the bottom wall sections 17 and 18 between the angularly extending edges 78, 92, 86 and 98 of the slots or openings 75, 89, 82 and 95, respectively, and the adjacent median fold line 19 between the bottom wall sections 17 and 18 of the carton. This latching engagement of the hook-shaped lower end portions 81, 94, 101 and 88 of the end flaps 56, 54, 53 and 55 with the said triangular-shaped latching web portions 80, 93, 87 and 100, respectively, of the bottom wall sections 17 and 18 prevents the said end flaps 56, 54, 53 and 55 from being forced outwardly out of the slots or openings 75, 89, 82 and 95 in the bottom wall sections 17 and 18 and thereby substantially eliminates or minimizes breakage of the eggs in the end cells of the erected carton. At the same time this latching arrangement substantially eliminates, or at least greatly minimizes, the possibility of tearing or rupturing of the end webs 199, 200, 201 and 202 which are formed in the bottom wall sections 17 and 18 of the carton between outer side edges 76, 90, 83 and 96 of the slots or openings 75, 89, 82 and 95, respectively, and the adjacent end edges of the bottom wall sections 17 and 18.

When the new egg carton is in erected and filled condition the bottom wall sections 17 and 18 thereof are held in raised and inclined cushion-forming condition primarily by the coaction of the body portions 203 and 46 of the central longitudinal partition sections 36 and 37 and the primary bottom wall-supporting elements which are formed by the adhesively joined parts 57—61, 58—62, 59—63 and 60—64. The primary bottom wall-supporting elements 57—61, 58—62, 59—63 and 60—64, thus formed, extend vertically downwardly from the central longitudinal partition in the same vertical plane therewith.

It will be noted, however, that if the adhesively joined parts of the primary bottom wall-supporting elements 57—61, 58—62, 59—63 and 60—64, or any of them, should become detached or separated when the new egg carton is filled and in use, or prior to erection, filling and use, the auxiliary bottom wall-supporting elements which are formed by the adhesive connection of the hinged elements 65, 66 and 67 of the section 37 with the corresponding areas or portions 72, 73 and 74 of the bottom wall section 17 will serve to retain the inner end portions of the bottom wall sections 17 and 18 in raised and inclined cushion-forming position. It will further be noted, in this connection, that the areas or portions 72, 73 and 74 of the bottom wall section 17 to which the auxiliary bottom wall-supporting elements 65, 66 and 67 are adhesively joined are integrally connected by and along the median fold line 19 to the bottom wall section 18 and hence the supporting action of these auxiliary bottom wall-supporting elements 65, 66 and 67 is likewise exerted or transmitted through the bottom wall section 17 to the bottom wall section 18.

The cover section 24 may then be pivoted, along the fold line 25, into a position above the body of the filled egg carton whereupon the cover latching strip or flap 26 may be latchingly engaged in closed position, inwardly of and substantially parallel to the front wall section 20. The cover latching flap or strip 26 is thereupon held in closed position by engagement of the latch tongues 28 thereon under the triangular-shaped webs 115, 122, 129, 136 and 143 (Fig. 8) and this movement of the cover latching flap or strip 26 into latched position is facilitated by the provision of the notches 29 to 35, inclusive, therein, as is well understood in the art. The thus erected and filled and closed carton may then be packed and shipped in a conventional fifteen or thirty dozen egg crate, or otherwise.

When the cover section 24 and its attached latching strip or flap 26 are in closed position, the cover section 24 bears along its longitudinal center upon, and is supported by, the upper end portions of the adhesively connected cover-supporting elements 52—45, 51—44, 50—43, 49—42, 48—41 and 47—40 which are formed as integral parts of the body portions 203 and 46 of the longitudinal or center partition sections 36 and 37 and the weight of other filled cartons resting upon the cover section 24 is transmitted through the body portions 203 and 46 of the longitudinal partition sections 36 and 37 to the primary bottom wall-supporting elements formed by the adhesively connected parts 57—61, 58—62, 59—63 and 60—64. In this manner the cover section 24 is adequately supported against the weight of overlying loads and forces which might otherwise tend to crush the cover section 24 and the eggs in that carton. Hence the new cartons may be packed and shipped in cases of fifteen or thirty, as is customary in the art, without damage to the eggs contained in the cartons and this is of especial significance as to the eggs in those cartons which are disposed at the bottom of such thirty dozen cases and which are subjected to substantial overlying loads.

It will also be noted that in the use of the new carton shown in Figs. 1 to 10, inclusive, the inclined bottom wall sections 17—18 are held in raised and inclined cushion-forming position and the longitudinal or center partition is held in upright position, when the carton is erected and filled, without being suspended from or engaged and held up by the transverse partitions or egg cell dividers 110, 117, 124, 131, 138, 149, 156, 163, 170, and 177, or by the end flaps 53, 54, 55 and 56.

It will also be noted that in the carton shown in Figs. 1 to 10, inclusive, the transverse partitions or egg cell dividers and the end flaps in each of the two rows thereof are separate from each other, and are integrally joined at their inner ends to the body portions 203 and 46 of, and terminate at their ends at, the longitudinal or center partition sections 36 and 37, rather than extending entirely across the carton transversely thereof, when the carton is in erected condition. This arrangement of the transverse partitions or egg cell dividers 110, 117, 124, 131, 138, 149, 156, 163, 170 and 177, and of the end flaps 54, 53, 56 and 55, in the erected carton results from the fact that in the carton shown in Figs. 1 to 10, inclusive, the aforesaid transverse partitions or egg cell dividers and the end flaps 54, 53, 56 and 55 are formed in the blank (Fig. 1) in and from the same contiguous and integrally joined sections 36 and 37 which form the center or longitudinal partition in the completely assembled and erected carton rather than forming the transverse partitions or egg cell dividers and the end flaps and the center or longitudinal partition from separate or spaced sections of the blank.

By reference to Fig. 1 of the drawings it will noted that all of the parts embodied in the blank 15 are formed entirely within the substantially parallel side marginal edges 77 and 84 of the blank 15. This effects an economy in the amount of paperboard stock required to form the new egg carton which is formed from the blank 15 compared to other egg cartons of a comparable character in which at least some parts thereof are formed by portions projecting outwardly beyond the side marginal edges of the blank.

A modification of the invention is illustrated in Figs. 11 to 15, inclusive, of the drawings and this form of the invention is designed to provide an egg carton which may be divided transversely to provide two twin egg cartons each holding six eggs in two rows of three.

Those parts which are embodied in the modification illustrated in Figs. 11 to 15, inclusive, which correspond to or are similar to parts in the form of the invention shown in Figs. 1 to 10, inclusive, have been given similar reference numerals followed by the additional reference character a. Hence a detailed description of these parts is unnecessary and only such parts which are embodied in the modification shown in Figs. 11 to 15, inclusive, will be specifically described as distinguish that form of the invention from the form shown in Figs. 1 to 10, inclusive.

The modified form of the new carton which is illustrated in Figs. 11 to 15, inclusive, differs from the form of the new carton illustrated in Figs. 1 to 10, inclusive, primarily in the fact that the carton formed from the carton blank 15a shown in Fig. 11 is divisible transversely along a line of severance or weakened union 198 to provide two twin egg cartons each adapted to hold six eggs in three rows of two. This necessitates the formation of four end flaps 54a—53a—55a—56a in each of the complementary half sections of the carton blank 15a or a total of eight end flaps in the complete carton blank 15a. This necessitates a rearrangement of certain of the parts in the form of the divisible carton blank shown in Fig. 11 relative to corresponding parts in the non-divisible form of the new carton blank shown in Fig. 1 including a rearrangement of the transverse partitions or egg cell dividers 149, 156, 177, 110, 117 and 138 as well as the elimination of the cover-supporting elements 51, 50, 48, 44, 43, and 41 and the elimination of two of the supporting elements 59 and 60 and two of the corresponding supporting elements 63 and 64 which are incorporated in the non-divisible form of the new egg carton blank which is illustrated in Fig. 1. Moreover, the formation of the transversely divisible egg carton blank 15a, which is shown in Fig. 11, requires a rearrangement of other parts embodied in the form of the carton blank shown in Fig. 1 as may be seen by comparing the transversely divisible egg carton blank shown in Fig. 11 with the non-divisible egg carton blank shown in Fig. 1.

The method of gluing, folding, assembling and erecting the transversely divisible form of the new egg carton which is formed from the blank shown in Fig. 11 is substantially the same as the method employed in gluing, folding, assembling and erecting the non-divisible egg carton which is formed from the blank shown in Fig. 1 and hence it is deemed unnecessary to describe the method of gluing, folding, assembling and erecting the transversely divisible egg carton which is formed from the blank shown in Fig. 11 of the drawings.

It will be noted that the new transversely divisible egg carton which is formed from the blank shown in Fig. 11 is formed from a substantially rectangular-shaped blank and that all of the component parts in the blank, as shown in Fig. 11, including all eight end flaps or end walls 53a—54a—55a—56a and 53a—54a—55a and 56a are formed entirely within the substantially parallel side marginal edges 77a and 84a of the transversely divisible egg carton blank 15a, thereby effecting an economy in the amount of paperboard stock required in the manufacture of the new transversely divisible egg carton which is formed from the egg carton blank 15a shown in Fig. 11 as compared to other transversely divisible egg cartons in which at least some of the parts in the blank project outwardly beyond the substantially parallel side marginal edges of the blank.

It will thus be seen from the foregoing description, considered in conjunction with the accompanying drawings, that the present invention affords new and relatively simple egg cartons which are economical in manufacture from the standpoint of the amount of paperboard stock or material required to form the blanks from which the new egg cartons are formed, and that the present invention thus accomplishes its intended objects, and that the new egg cartons afforded thereby have the desirable characteristics and advantages including those hereinbefore pointed out and others which are inherent in the invention.

We claim:

1. An egg carton formed from a single egg carton blank embodying a pair of integrally joined and contiguous central longitudinal partition-forming sections, said blank being cut, scored, and glued and folded to form a flat collapsed but erectable carton which in its erected condition includes a front side wall, a rear side wall, end flaps, transverse partitions or egg cell dividers, a bottom wall including a pair of integrally connected bottom wall sections arranged between said front wall and said rear wall and said bottom wall sections being inclined upwardly from their outer edges toward and along the longitudinal center of the said bottom wall of the carton and providing a raised, inclined cushioned bottom for the carton, a cover, a glue strip adhesively attached to one of said side walls at the inner side thereof, a central longitudinal partition disposed between said front wall and the said rear wall, primary bottom wall-supporting elements attached to and extending downwardly from the said central longitudinal partition in the same vertical plane therewith and cooperating with the said central longitudinal partition and with the said inclined bottom wall partition for retaining the inner end and longitudinal center portion of said inclined bottom wall in raised and upwardly inclined cushion-forming position, and the said egg carton including auxiliary supporting bottom wall-supporting elements each having an end portion integrally and hingedly connected to one of the said central longitudinal partition-forming sections and secured to one of the said bottom wall sections for retaining the inner end and longitudinal center portion of the said inclined bottom wall in raised and inclined cushion-forming position.

2. An egg carton as defined in claim 1 in which all the said auxiliary bottom wall-supporting elements are adhesively secured to one of the said bottom wall sections.

3. An egg carton as defined in claim 1 in which all the said auxiliary supporting elements are adhesively secured to one of the said bottom wall sections on the upper surface of the latter.

4. An egg carton as defined in claim 1 in which the said auxiliary bottom wall-supporting elements are arranged at spaced intervals along and relative to the said central longitudinal partition and relative to said bottom wall of the carton and in which each of the said auxiliary bottom wall-supporting elements is adhesively secured to one of the said bottom wall sections on the upper surface thereof.

5. An egg carton as defined in claim 1 in which the said auxiliary bottom wall-supporting elements are arranged at spaced intervals along and relative to the said central longitudinal partition and relative to the said bottom wall of the carton and in which each of the said auxiliary bottom wall-supporting elements is in the form of a substantially flat tongue hingedly connected by a fold line to one of the said central longitudinal partition-forming sections and adhesively secured to one of the said bottom wall sections on the upper surface of the later.

6. An egg carton formed from a single egg carton blank embodying a pair of integrally joined and contiguous central longitudinal partition-forming and transverse partition-forming and end flap-forming sections, said blank being cut, scored, glued and folded to form a flat collapsed but erectable carton which in its erected condition includes a front side wall, a rear side wall, a bottom wall including a pair of integrally connected bottom wall sections arranged between said front wall and said rear wall and said bottom wall sections being inclined upwardly from their outer edges toward and along the longitudinal center of the said bottom wall of the carton and providing a raised, inclined cushioned bottom for the carton, a cover, a glue strip adhesively attached to one of said side walls at the inner side thereof, one of the said bottom wall sections having a plurality of tongue portions partially cut therefrom at spaced intervals therealong and one of the said central longitudinal partition-forming sections having tongue portions formed integrally therewith at spaced intervals therealong and adhesively joined to the said tongue portions partially cut from the said one of the said bottom wall sections to provide primary bottom wall-supporting elements extending below the said central longitudinal partition in the same vertical plane therewith and cooperating with the said central longitudinal partition and with the said bottom wall sections for retaining the longitudinal center portion of the said bottom wall sections in raised and upwardly inclined cushion-forming position, downwardly foldable end flaps arranged at each side of the said central longitudinal partition, a row of transverse partitions or egg cell dividers arranged at each side of the central longitudinal partition between the said end flaps, and the said egg carton including auxiliary bottom wall-supporting elements each having an end portion integrally and hingedly connected to one of the said central longitudinal partition-forming sections and secured to one of the said bottom wall sections for retaining the inner end and central longitudinal portion of the said bottom wall in raised and inclined cushion-forming position in the event that the said adhesively joined tongues providing the said primary bottom wall-supporting elements should become detached from each other.

7. An egg carton as defined in claim 6 in which each of the said auxiliary bottom wall-supporting elements is adhesively secured to one of the said bottom wall sections on the upper surface of the latter.

8. An egg carton as defined in claim 6 in which the said auxiliary bottom wall-supporting elements are arranged at spaced intervals along and relative to the said central longitudinal partition and relative to the said bottom wall and in which each of the said auxiliary bottom wall-supporting elements is adhesively secured to one of the said bottom wall sections on the upper surface thereof.

9. An egg carton as defined in claim 6 in which the said auxiliary bottom wall-supporting elements are arranged at spaced intervals along and relative to the said central longitudinal partition and relative to the said bottom wall and in which each of the said auxiliary supporting elements is in the form of a substantially flat tongue hingedly connected by a fold line to one of the said central longitudinal partition-forming sections and adhesively secured to one of the said bottom wall sections on the upper surface of the latter.

10. An egg carton formed from a single egg carton blank embodying a pair of integrally joined and contiguous central longitudinal partition-forming and transverse partition-forming and end flap-forming sections, said blank being cut, scored, glued and folded to form a flat collapsed but erectable carton which in its erected condition includes a front side wall, a rear side wall, a bottom wall including a pair of integrally connected bottom wall sections arranged between said front wall and said rear wall and said bottom wall sections being separated by a center line and respectively inclined upwardly from their outer edges toward and along the longitudinal center of the said bottom wall of the carton and providing a raised, inclined cushioned bottom for the carton, a cover, a glue strip adhesively attached to one of said side walls at the inner side thereof, a central longitudinal partition disposed between said front wall and said rear wall and embodying as component parts thereof supporting elements cooperating with said inclined bottom wall for retaining the longitudinal center portion of said bottom wall in raised and upwardly inclined cushion-forming position, downwardly foldable end flaps arranged at each side of said central longitudinal partition, a row of spaced downwardly foldable transverse partitions or egg cell dividers arranged at each side of said central longitudinal partition between the said end flaps, each of the said bottom wall sections having latch receiving openings respectively in each outer end portion adjacent the marginal sides thereof and each of the said openings having an outer side edge extending substantially parallel to one marginal side edge of the said egg carton and terminating in spaced relation to the center line separating the bottom wall sections, each of the said openings having another marginal edge extending angularly inwardly from the terminal end of said outer side edge toward and terminating in spaced relation to the longitudinal center line of the said bottom wall of the carton, the space between the terminal end of said last mentioned marginal edge and the center line being less than the space between the terminal end of the outer side edge of the opening and the center line, thereby defining a generally triangular-shaped latching portion in the body of each of the said bottom wall sections between the said angularly extending edge of each of the said openings, the said longitudinal center line of the said bottom wall and an imaginary line extending from the terminal end of the said outer side edge of the opening to the center line and each of the said end flaps having a lower end portion adapted to be extended downwardly through one of the said openings in the bottom wall of the said egg carton and having a hook-shaped latching portion latchingly engageable beneath the said generally triangular-shaped latching portions in the said bottom wall section when the said end flaps are extended downwardly through the said openings in the bottom wall of the said carton and bear against the said outer side edges of the said openings.

11. An egg carton as defined in claim 1 in which the said egg carton blank is provided with a transversely extending medial line of weakened union so that when the said egg carton is in glued, assembled, erected and fil'ed condition it may be divided into two twin egg carton sections each holding six eggs in two rows of three.

12. An egg carton as defined in claim 6 in which the said egg carton blank is provided with a transversely extending medial line of weakened union so that when the said egg carton is in glued, assembled, erected and filled condition it may be divided into two twin egg carton sections each holding six eggs in two rows of three.

WILLIAM H. ALLEN.
MAYNARD G. HALL.

REFERENCES CITED

The following references are of record in the file of this patent:

UNITED STATES PATENTS

| Number | Name | Date |
|---|---|---|
| 1,511,678 | Schwartzberg | Oct. 14, 1924 |
| 1,948,322 | Walsh | Feb. 20, 1934 |
| 1,985,579 | Reich | Dec. 25, 1934 |
| 2,103,382 | Petter | Dec. 28, 1937 |
| 2,161,128 | Boyle | June 6, 1939 |
| 2,244,961 | Nydegger | June 10, 1941 |
| 2,322,876 | O'Reilly | June 29, 1943 |